United States Patent
Wildsfeuer

(10) Patent No.: US 11,029,667 B2
(45) Date of Patent: Jun. 8, 2021

(54) METHOD FOR OPERATING AN ASSEMBLY FOR PROCESSING LIQUID FOOD PRODUCTS

(71) Applicant: KRONES AG, Neutraubling (DE)

(72) Inventor: Felix Wildsfeuer, Neutraubling (DE)

(73) Assignee: KRONES AG, Neutraubling (DE)

(*) Notice: Subject to any disclaimer, the term of this patent is extended or adjusted under 35 U.S.C. 154(b) by 70 days.

(21) Appl. No.: 16/464,216

(22) PCT Filed: Jul. 13, 2017

(86) PCT No.: PCT/EP2017/067719
§ 371 (c)(1),
(2) Date: May 24, 2019

(87) PCT Pub. No.: WO2018/095588
PCT Pub. Date: May 31, 2018

(65) Prior Publication Data
US 2019/0384264 A1    Dec. 19, 2019

(30) Foreign Application Priority Data
Nov. 25, 2016    (DE) .................. 10 2016 223 411

(51) Int. Cl.
*G05B 19/4155*    (2006.01)
*G06K 7/14*    (2006.01)

(52) U.S. Cl.
CPC ....... *G05B 19/4155* (2013.01); *G06K 7/1413* (2013.01); *G06K 7/1417* (2013.01); *G05B 2219/45111* (2013.01)

(58) Field of Classification Search
CPC ...... G05B 19/4155; G05B 2219/45111; G06K 7/1413; G06K 7/1417; G06Q 10/20; G06Q 10/06
See application file for complete search history.

(56) References Cited

U.S. PATENT DOCUMENTS

| | | |
|---|---|---|
| 6,136,362 A * | 10/2000 | Ashton .................. A23C 7/02 |
| | | 134/169 R |
| 2012/0137793 A1* | 6/2012 | Hofman .................. G01N 1/20 |
| | | 73/863.33 |

(Continued)

FOREIGN PATENT DOCUMENTS

| | | |
|---|---|---|
| GB | 2247333 A | 2/1992 |
| WO | 0205044 A2 | 1/2002 |
| WO | 03023570 A2 | 3/2003 |

OTHER PUBLICATIONS

ISA European Patent Office, International Search Report Issued in Application No. PCT/EP2017/067719, dated Oct. 2, 2017, WIPO, 6 pages.

(Continued)

*Primary Examiner* — Ziaul Karim
(74) *Attorney, Agent, or Firm* — McCoy Russell LLP

(57) ABSTRACT

Provided is a method for operating an assembly for processing liquid food products, where the operation of the assembly comprises automatically executable steps and steps to be executed manually for various elements of the assembly, where machine readable pieces of information are applied to at least one of the various elements the machine-readable pieces of information identifying the respective element, where the steps to be executed manually are in a processing unit each associated with an execution status which is set to "executed" under the condition that the machine-readable pieces of information are read out at at least one predetermined element by way of a mobile terminal, and where a control device controls the automatically executable steps taking into account the execution status.

15 Claims, 1 Drawing Sheet

(56) References Cited

U.S. PATENT DOCUMENTS

| | | |
|---|---|---|
| 2013/0123953 A1* | 5/2013 | Reichard .............. G05B 19/408 |
| | | 700/83 |
| 2013/0138465 A1 | 5/2013 | Kahle et al. |
| 2013/0217417 A1 | 8/2013 | Mohideen et al. |
| 2013/0233922 A1 | 9/2013 | Schoening et al. |
| 2013/0278635 A1 | 10/2013 | Maggiore |
| 2014/0149172 A1 | 5/2014 | Rogut et al. |
| 2014/0234165 A1* | 8/2014 | Glazer .................... A61L 11/00 |
| | | 422/38 |
| 2015/0290795 A1* | 10/2015 | Oleynik ................. B25J 9/0081 |
| | | 700/257 |
| 2015/0379462 A1* | 12/2015 | Wetsch ................ G06Q 10/087 |
| | | 705/28 |
| 2019/0384264 A1* | 12/2019 | Wildsfeuer ............ G06Q 10/20 |

OTHER PUBLICATIONS

Martin, T., "Use this low-budget hack to control your smart home more easily," CNet Website, Available Online at https://www.cnet.com/how-to/use-this-low-budget-hack-to-control-your-smart-home-more-easily/, Feb. 26, 2016, 3 pages.

\* cited by examiner

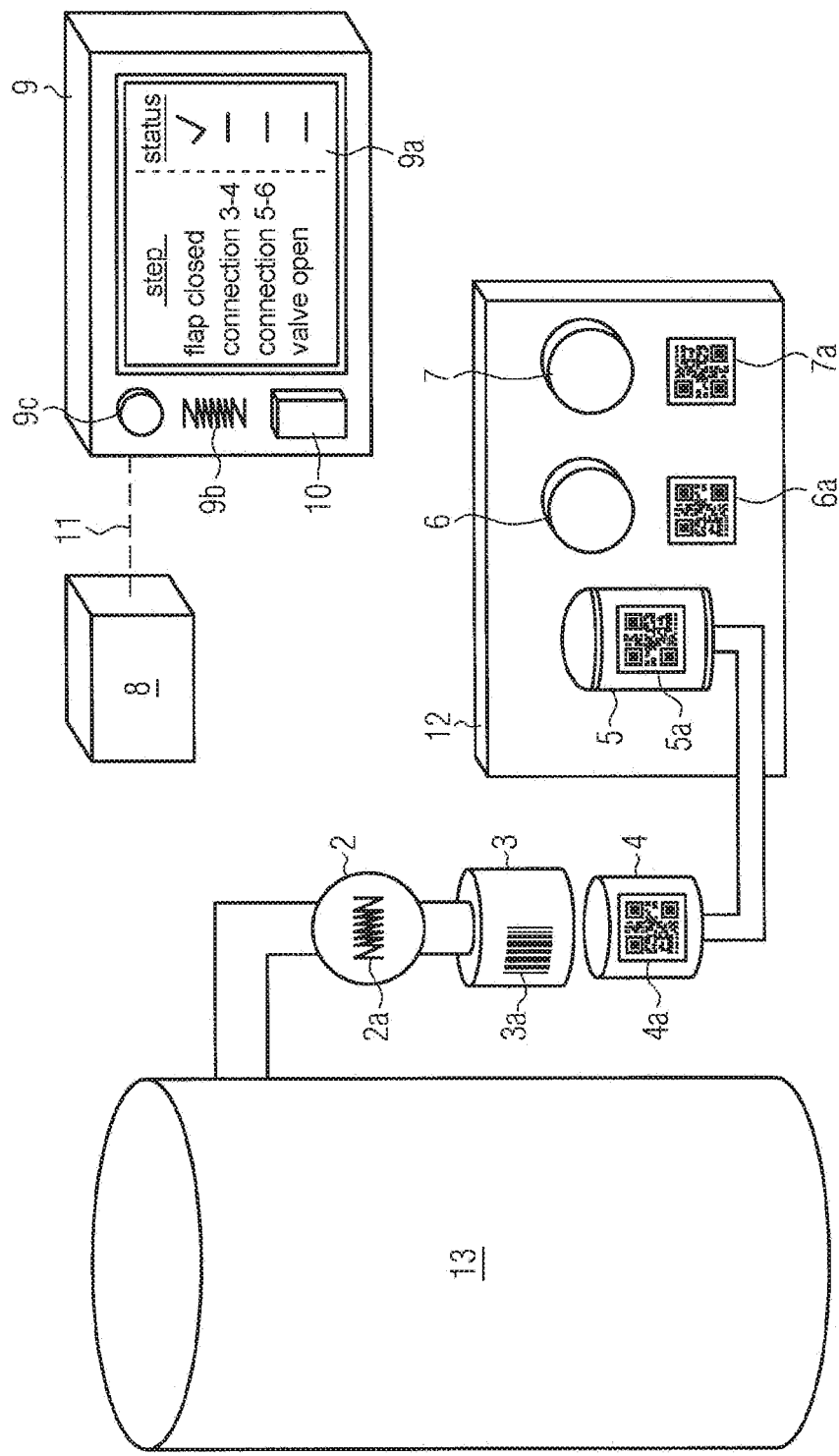

METHOD FOR OPERATING AN ASSEMBLY FOR PROCESSING LIQUID FOOD PRODUCTS

CROSS-REFERENCE TO RELATED APPLICATIONS

The present application is a U.S. National Phase of International Patent Application Serial No. PCT/EP2017/067719 entitled "METHOD FOR OPERATING A SYSTEM FOR PROCESSING LIQUID FOOD PRODUCTS," filed on Jul. 31, 2017. International Patent Application Serial No. PCT/EP2017/067719 claims priority to German Patent Application No. 10 2016 223 411.0 filed on Nov. 25, 2016. The entire contents of each of the above-referenced applications are hereby incorporated by reference for all purposes.

TECHNICAL FIELD

The invention relates to a method for operating an assembly for processing liquid food products, where the operation of the assembly comprises automatically executable steps and steps to be executed manually for various elements of the assembly.

BACKGROUND AND SUMMARY

The term "operating the assembly" covers both the production of a product by way of the assembly as well as the conversion of the assembly to the production of a different product, possibly including cleaning the assembly.

Assemblies for processing liquid food products are often semi-automatic assemblies in which automatically actuated assembly components are present, such as valves, motors of stirring units or pumps, with or for which automatically executable steps are executed, but also assembly components to be operated manually, such as connection elements of hose connections or flaps for or with which steps are to be executed manually.

In such assemblies, there is basically the risk of the assembly being operated incorrectly, for example, that steps are omitted or executed incorrectly.

Hose connections in larger assemblies, for example fermentation and storage cellars using hose technology, are an example of this, where it is not unlikely due to size that the overview of the connections established (or not established) is lost due to the greater distances and number of hoses, so that connections are not established or established incorrectly. This can result in material and product damage as well as personal injury.

For example, a (partially) automatically performed cleaning process could lead to great damage if the correct line connections are not correctly established or disconnected.

Initiators at the point of connection that might indicate potential problems are expensive, also due to the wiring and labor costs for maintenance and other follow-up costs, and can possibly only provide information that a connection has been established, but not whether it is the correct one. This in turn increases the likelihood of faulty operation, accidents and personal injury.

The invention is therefore based on the problem of providing a method which reduces the likelihood of faulty operation or wrong conversion of assemblies in which the operation of the assembly comprises automatically executable steps and steps to be executed manually for various elements of the assembly. In other words, a method is to be provided which makes it possible to reduce the risk of operating errors and resulting material damage, product damage, machine damage and personal injury, and to enable a safer method for operating the assembly.

The problem is solved by the features that machine-readable pieces of information identifying the respective element are applied to at least one of the various elements, that a respective execution status in a processing unit is respectively associated with the steps to be executed manually and is set to "executed" under the condition that the machine-readable pieces of information are read out on at least one predetermined element by way of a mobile terminal, and that a control device controls the automatically executable steps taking into account the execution status.

This means that a user can confirm by reading out certain machine-readable pieces of information that he has executed certain steps to be executed manually.

This is done on the spot where the pieces of information are read, so that it is always ensured that the user was at that location, which makes it more likely that he has actually executed the step than if he were simply confirming it by some user input. The latter would namely result in the user being able to execute various steps and then specify that he had executed them based on his memory, with the risk being given that the user does not recall this correctly and has forgotten certain steps.

In addition, processes and their sub-steps become more comprehensible and the correct execution can be better verified, for example, by the master brewer or the safety inspector.

The process is applicable to various assemblies in the beverage and food production industry, such as in breweries, in particular in assemblies that comprise tanks and pipe or hose systems. The elements of the assembly comprise, for example, fittings, flaps, valves, connectors, pipe ends, hose ends, cables and terminals for cables.

The processing unit can be part of the mobile terminal or the control device or can be present separately.

Steps to be executed manually and automatically executable steps can also be referred to in short below as manual or automatic steps.

The term "identifying" presently means that the pieces of information applied to an element are associated with exactly one element of the assembly so that it can be uniquely determined from these pieces of information which element they identify. Exactly the pieces of information identifying exactly one element are sometimes also referred to below as "information", for example meaning a bar code or a QR Code©.

The predetermined element can also be referred to as forming part of the respective step or being associated with the respective step.

The information being "applied to an element" comprises that it is printed, lasered or engraved directly onto the element or attached to the element, for example, clamped, affixed or glued on, in particular permanently attached to the element, for example on or at fittings, flaps, valves, connectors, pipe ends or hose ends. In the case of connection elements or cable terminals on a panel, the information can not only be printed directly onto the element or attached to the element, but alternatively can be arranged on the panel adjacent to the element such that unique association of the information with the element is possible.

The term "execution status" and its values (e.g., "executed," "not executed") are used in this application to express that the information available to a processing unit about the execution of a step does not necessarily correspond to reality since it is quite possible that a user reads out machine-readable pieces of information and, possibly, sets the execution status to "executed" without already having executed the corresponding step. For example, it is not excluded that a user first reads out the pieces of information and then executes the respective step. This means that the choice of terminology allows for the discrimination between the point in time of the actual execution of a step and the point in time when the processing unit considers the step to have been executed.

The terms "executed," "not executed," or "executed incorrectly" are used merely to represent the pieces of information of any format (names, letters, characters, or the like) that uniquely identify these states of execution. For example, a value "1" in a memory could mean that a step is deemed to have been executed and a value "0" that the step is not deemed to have been executed.

The application describes that the execution status is set to "executed," "not executed," or "executed incorrectly." It should be noted that "setting" the execution status does not necessarily have to be a change of the execution status. Meaning, the term is also to comprise where it is determined that the execution status does not change, i.e., the execution status is reset to the same value. This "setting" does not necessarily have to entail rewriting a memory state.

The control device can control the automatically executable steps such that predetermined automatically executable steps are executed only after the execution status of predetermined steps to be executed manually has been set to "executed."

For example, the control device can verify, triggered by user input and/or at certain times and/or at certain time intervals, whether the execution status of the predetermined steps to be executed manually is set to "executed". If it is determined in this verification that this is the case, then the predetermined automatically executable steps can be executed and no further query of the execution status of the predetermined steps to be executed manually be made.

If such a verification reveals that the execution status is not set to "executed" for all predetermined steps to be executed manually, then the predetermined automatically executable steps are not executed and the execution status is optionally again verified at a predetermined later point in time or at predetermined intervals. The execution status can be again verified for all predetermined steps to be executed manually, which has the advantage that it is ensured that the user in the meantime has not reversed manual steps and reset their execution status. Alternatively, only the execution status for the predetermined steps to be executed manually can be verified whose execution status had not been "executed" during the previous verification.

The above-described method can be used to prevent the accidental start-up of automatic processes, for example, an automatic cleaning operation, before the assembly is prepared for them. For example, it is conceivable that the predetermined steps are steps to be executed manually, that food tanks are separated from a pipe system and the pipe system is connected to a cleaning agent tank and a drain. In this case, automatically executable steps of an automatic cleaning operation of the pipe system can be executed only when the execution status for all manual steps has been set to "executed". This can be the automatic opening of valves and the starting of pumps.

By making the execution of automatic steps dependent on whether the user, by reading out the corresponding machine-readable pieces of information, confirms that certain predetermined steps to be executed manually have taken place, it is possible to prevent damage caused by the system not yet having been taken to the initial state for the predetermined automatically executable steps.

It is possible to delay execution of the predetermined automatically executable steps by a predetermined time interval, after the execution status of the last predetermined step to be executed manually has been set to "executed". Alternatively or additionally, setting the execution status to "executed" after the corresponding pieces of information have been read out can be delayed by a predetermined time interval. This can then take into account that a user first reads out the pieces of information and then executes the respective step. In other words, it is thereby taken into account that setting the execution status of a step to "executed" can occur before the actual execution of the step.

The steps to be executed manually can comprise connecting two predetermined elements, in particular, pipes, hoses and/or nozzles, of the assembly, and the method can comprise determining by way of the processing unit whether two pieces of machine-readable information read out in immediate succession using the mobile terminal identify the two predetermined elements, and optionally, whether the two pieces of information have been read out in a predetermined time window.

The execution status for the step of connecting the two predetermined elements can be set to "executed" on the condition that the machine-readable pieces of information read out in immediate succession identify the two predetermined elements, and in particular was read out in a predetermined time window, and is otherwise set to "not executed".

This allows the control unit to recognize that the manual step has not been executed or executed incorrectly, which in turn prevents that automatically executable steps are erroneously started.

In the event that a user connects two wrong elements to each other or does not at all connect certain elements which would need to be connected, this prevents in particular that the processing unit and the control unit erroneously assume that this step has been executed, and automatic steps, which should have taken place only after the correct execution of this step, are then executed. This means that a user error can be intercepted and does not lead to immediate damage.

It is further to be noted that, by demanding that the terminal is the same and that the pieces of information are read out immediately in succession and preferably within a predetermined time window, there is a greater likelihood that the pieces of information of the two elements were not read out by coincidence without the corresponding step actually having been executed.

This ensures that the correct elements are connected to each other.

In addition, a step to be executed manually can comprise that locking two elements, after being connected to each other, are locked by way of a locking element, for example, after they have been plugged together. For example, this can be a clamping lever, a bayonet or a fastening nut. It is possible that a confirmation is also given for this locking step. For this purpose, machine-readable information can be applied to the locking element, the machine-readable information identifying the respective element and being associated with a locking step.

The locking element can also be formed in two or more parts, and the lock can be obtained by adjusting the relative position of the two parts. In this case, machine-readable information can be applied to each respective part. The locking step can then be associated with both pieces of information and the execution status be set to "executed" when both pieces of information are read out, similar to the connection step described above. The two pieces of information are preferably positioned such that it can be recognized from the position of the two pieces of information whether a lock has been established or not. For example, the pieces of information can be arranged in an offset manner when no lock has been established and positioned in line when a lock has been established. Alternatively, machine-readable information used to confirm the locking step can also be applied to only one of the two parts and an optical indication that is indicative of the locking position but is not necessarily machine-readable can be applied to the other part.

When the position of the locking element relative to another element, that is not part of the locking element, is adjusted for locking, the procedure can be similar to that of the two-part locking element. Here as well, corresponding machine-readable information, with which the locking step can be confirmed, can be applied to at least the locking element. Similar to the above, further information, optionally machine-readable information, can be applied to the other element there as well, so that the user can see from the relative position of the two pieces of information whether a lock has been established.

It is also conceivable that a photo of a locking element and possibly also of the elements to be locked is created using the camera of the mobile terminal. A target state can be deposited, for example, in the form of a photo of the locking element or different parts of the locking element in the locked position, where the photo can optionally additionally also depict the elements to be locked. By comparing the two photos, it can then be determined whether the step of locking the correct elements has been executed correctly. For example, it can be determined whether a clamping lever is in the correct locking position. Additional machine-readable information on the locking element or the parts of the locking element is not necessarily needed when photos are compared. The comparison of the photos can be done by image processing and be performed by the user terminal or the processing unit. Additional machine-readable pieces of information on the locking element are then not necessary.

However, an optical indication can optionally be provided, for example, in the form of optical markings which are applied to the locking element and optionally to other elements at one or more predetermined positions. Such markings can be used as reference points for image processing. For example, they can be arrows, circles, polygons or the like. If the indication comprises such markings, the markings can comprise, for example, at least two optically distinguishable but otherwise arbitrarily configured markings on the locking element. Alternatively or additionally, in the case of a multi-part locking element, at least one marking can be respectively arranged on each of at least two parts whose relative position changes when locked. Alternatively or additionally, at least one marking can be arranged on the locking element and the machine-readable information of at least one of the elements to be connected and to be locked or a marking on this element can serve as a further marking. It can thus be taken into account comparatively easily during image processing that the user is possibly holding the terminal at a different distance or with a different orientation than was the case for the reference photo.

The mobile terminal can output, for example, an acoustic, optical and/or haptic warning, if the above-mentioned condition is not satisfied. Outputting a warning is advantageous because the user is then immediately aware of the error and can rectify it directly.

The machine-readable pieces of information can comprise optically readable information, such as a bar code or a QR Code©, and/or electronically readable pieces of information, such as pieces of information readable by way of an RFID or NFC antenna.

An RFID tag or an NFC antenna which contains the machine-readable pieces of information may be applied to at least one of the elements, and the pieces of information can be read out by way of a corresponding antenna of the mobile terminal.

Alternatively or additionally, a QR Code© or a bar code can be applied to at least one of the elements and the pieces of information can be read out by way of a camera of the mobile terminal.

The advantage is that optically readable pieces of information can be easily captured with the camera of a mobile terminal and that almost all common mobile terminals are equipped with suitable cameras. In addition, many such terminals are also equipped with software that can evaluate barcodes or QR Codes©. Many mobile terminals are also already equipped with antennas with which electronically readable pieces of information can be read out. For example, many cell phones already support an NFC feature. The advantage of electronically readable pieces of information is that also less accessible elements, which are possibly hidden by other elements, can be identified therewith.

When various elements are arranged so close to each other that it cannot be uniquely assigned during the electronic readout to which element the read information belongs, which depends, for example, on the range of the respective antenna, it can be advantageous that two adjacent pieces of machine-readable information are of a different kind, for example, one of a visual and the other of an electronic kind.

A representation of at least some of the steps to be executed manually and their respective current execution status can be shown on a display section, for example, a display of the mobile terminal, in particular possibly in the sequence in which they need to be executed and/or with instructions on how they are to be executed. For example, a list view or a tabular view is conceivable. Displaying can be automatic or upon request by the user, immediately or also later.

For example, all steps to be executed manually and their respective status, or only those steps to be executed manually that have not yet been set to the execution status "executed", can be displayed.

The user can then easily verify which steps still need to be executed. In addition, the user can identify whether all steps have been executed correctly or whether a step has not been executed or has failed. If necessary, the user can also identify later which step has not been executed correctly, for example, if he detects that the execution of automatic steps does not start.

If an error occurs and the user does not notice it or not immediately, but only when the assembly cannot be operated as intended, and if, as before, there is no possibility to give the user any indication of where or which error has occurred, it is very cumbersome to find and correct the error considering typical assembly sizes and the typical number of steps to be executed manually. With the method described above, the user can selectively find and correct errors.

It is to be noted at this point that the feature that all steps are displayed comprises that all steps are displayed simultaneously on the display and, alternatively, that though the user can see all the steps, he does not see them all at the same time, and possibly must scroll or browse the display. The former is often impractical due to small display sizes, because the information can then not be recognizable due to the low magnification.

Determining, changing and/or storing the execution status of the steps to be executed manually can be done by use of the mobile terminal and the respective current execution status of one or more of the steps to be executed can then be transmitted from the mobile terminal to the control device via a data connection, in particular, by way of a contactless connection like Wi-Fi or Bluetooth.

This is advantageous, in particular, when the execution status of each of the steps is shown to the user on the terminal, because pieces of information must then not first be sent to another device, such as the control device, and evaluated there and the execution status must then be transmitted to the terminal before this display is refreshed.

Alternatively or additionally, the mobile terminal can read out the machine-readable pieces of information and transmit them to the control device by way of a data connection, in particular via a contactless connection such as WI-FI or Bluetooth, and the control device can determine, change, and/or store the execution status. This is advantageous, for example, where the computing capacity and/or the memory of the terminal are rather small and/or where the information about the state of current execution status is not needed at the terminal.

The invention also relates to a system with an assembly for processing liquid food products. The assembly is configured such that the operation of the assembly comprises automatically executable steps and steps to be executed manually at various elements of the assembly, where machine-readable pieces of information are applied to the various elements identifying the particular element. The system, in particular the assembly, also comprises a control device for controlling automatically executable process steps. The system further comprises a mobile terminal. The control device is configured such that it controls the automatically executable steps taking into account an execution status of one or more of the steps to be executed manually, where the execution status reflects whether the machine-readable pieces of information on at least one predetermined element have been read out by way of the mobile terminal.

The control device can be configured such that it receives read out machine-readable pieces of information from the mobile terminal and determines from the received machine-readable pieces of information whether the execution status of one or more of the steps to be executed manually must be changed, in particular set to "executed", and, should this be the case, changes the execution status accordingly.

Alternatively or additionally, the control device can be configured to receive pieces of information identifying a step to be executed manually and its execution status. In this case, the mobile terminal or an external processing unit can be configured to determine, change and store the execution status.

Functions which have been described in connection with the method can each be performed by the control device and/or the mobile terminal in that they are configured accordingly.

In the context of the method described above, it should be noted that the features are likewise to be used for the system and the advantages mentioned there apply analogously to the features of the system.

BRIEF DESCRIPTION OF THE FIGURE

Further features and advantages shall be explained below with reference to the FIGURE which shows a schematic representation of an embodiment not to scale.

DETAILED DESCRIPTION

The FIGURE shows an assembly 1 with elements of the assembly 2 to 7 and corresponding machine-readable pieces of information 2a to 7a which identify the respective element. In addition, the FIGURE shows a control device 8, a mobile terminal 9, presently, for example, in the form of a tablet or a cell phone which comprises a display section in the form of a display 9a, an NFC antenna 9b and a camera 9c. In addition, the FIGURE shows processing unit 10, which is presently shown as part of the terminal, but can also be part of the control device or can be present separately. Furthermore, a data connection 11 is shown between the control unit and the terminal and can be, for example, a wireless connection such as Bluetooth or WI-FI. It is understood that the control unit also comprises data connections with which it can perform its control function in the assembly. However, they are presently not shown and would be self-explanatory to the person skilled in the art. The FIGURE also shows a panel 12 and a tank 13.

In this example, the elements are illustrated by way of example as follows: Element 2 comprises a shut-off flap, elements 3, 4, 5, 6, and 7 are connections, for example, of hoses or pipes. In this example, connections 3 to 5 are, in particular, connections of a pipe or a hose, and connections 6 and 7 are connections at a panel. Reference numeral 2a denotes an NFC antenna, and reference numerals 3a to 7a denote bar codes 3a and QR Codes© 4a to 7a, respectively.

For example, QR Codes© or bar codes can be printed or glued on as labels. The NFC antenna can be formed in a tag or the like and clamped on or suspended at the respective location. It is also possible to use printed NFC antennas.

However, it is to be understood that any additional elements or further elements can be present in the assembly and that any of the above-mentioned machine-readable pieces of information can be applied to each of these elements. For example, only optical or only electronic pieces of information can be present.

The method according to the invention for operating an assembly for processing liquid food products shall be described below. For the sake of clarity, reference is made to the assembly described above, but this can also be any other assembly in which machine-readable pieces of information are applied to various elements identifying the particular element.

It is presently described by way of example how a cleaning method for an assembly is initiated, in which several lines, for example hoses or pipes, are connected to each other, to tanks and/or to panels, and flaps and valves are present as shut-off elements.

In doing so, some steps can be executed automatically. For example, valves to product tanks can be automatically closed and valves to cleaning agent tanks automatically opened. In addition, a pump for pumping cleaning medium from one of the cleaning agent tanks through lines to be cleaned can be started automatically. Actuators, for example electric motors, which are actuated by a control device can be used for this.

Other steps that are executed to initiate the cleaning process include, for example, manually opening or closing flaps and disconnecting lines from other lines, tanks, or panels, and establishing new connections. The connections can be, for example, threaded connections having suitable sealing properties.

These manual steps are executed for various elements and one step can be associated with one element (for example the flap) or two elements (for example two connection regions) or possibly even more elements. Machine-readable pieces of information are applied to the elements for which manual steps are executed, such as the flaps and connection regions of the lines, tanks and/or panels, the machine-readable pieces of information uniquely identifying said elements.

As described above, these pieces of information can be optically readable or electronically readable.

Steps to be executed manually and automatically executable steps are stored in a processing unit, which is for example part of the mobile terminal or the control unit or is present separately, and one respective execution status is associated with at least each step to be executed manually, and preferably with all steps that are executable with or at the assembly.

The user selects a specific operation, for example, initiating the cleaning operation, for example, at the control device directly or on the mobile terminal.

The processing unit then determines which step to be executed manually and which automatically executable steps are associated with the selected operation and must be executed and whether this must be performed in a particular sequence. For this purpose, the processing device can access stored data defining this. Alternatively or additionally, however, a user can also enter and/or select certain steps and, where appropriate, their sequence. Determining which steps to execute comprises determining which steps require the execution status to be set to "executed".

The execution status for all steps can be set to "not executed" at the beginning of the procedure, which corresponds to a reset operation. However, it is conceivable that some steps have already been executed depending on the previous operation. In this case, their execution status can already be set to "executed" at the beginning.

When the user starts the operation, the control device verifies which automatically executable steps can be executed regardless of the execution status of other processes, and controls the corresponding elements such that these steps are executed. The execution status of these elements is set to "executed" after successful completion. For example, certain valves can be closed by an actuator immediately at the beginning of the operation.

In addition, the user can now be indicated by way of the mobile terminal which steps he must execute manually and, where appropriate, in which sequence. However, such indication is optional.

For example, a first step to be executed manually can be to close a flap. The user can do this and confirm the execution by reading out the machine-readable pieces of information on the flap using the mobile terminal. For example, he can use the camera of the terminal to take a photograph of a bar code or a QR Code© or read out pieces of information from an RFID tag or an NFC antenna using a suitable antenna of the terminal. The user is there not bound to reading out the pieces of information only after the execution, but can also read out the pieces of information directly prior to execution.

The pieces of information read out are then processed. It is determined which element is identified by the pieces of information read out and which step was to be executed for that element. The execution status of this step can then be set to "executed".

Since the user is not bound to executing the step prior to reading out the pieces of information, a predetermined delay between the readout and setting the execution status to "executed" can optionally be provided. Values for the delay can be stored in a storage medium. The values can be different for different steps, for example, if experience has shown that one step takes longer than another.

If the steps to be executed manually comprise that the user connects certain line ends, then machine-readable information, such as a code or an antenna, can be applied to each of these ends. The user can read the pieces of information at the two ends directly in succession using the mobile terminal, where the readout can be effected, for example, as described above.

The processing unit verifies whether the two elements identified satisfy certain conditions. The processing unit verifies whether a step of the operation to be executed manually is associated with exactly these two line ends, i.e. for example, whether a step to be executed manually represents connecting these line ends. In addition, it can optionally be verified whether both readout operations occur within a predetermined time interval.

If the condition(s) is(are) not satisfied and if one or both line ends are each associated with a step to be executed manually, then the latter is respectively set to "not executed". Alternatively, the execution status can also be set to "executed incorrectly". In this case, the terminal can also output an indication, for example a warning tone or a message on the screen of the terminal.

If the condition(s) is (are) satisfied, then the execution status of this step can be set to "executed," possibly with a predetermined delay, as discussed above.

Especially for steps in which a connection must be established correctly, it can be useful to specify a generous delay, because the user can then first read out the two pieces of information, then wait to see whether this connection is correct, i.e., whether the execution status can be set to "executed", and can then actually establish the connection. Disconnecting and connecting connections unnecessarily can then be avoided.

An analogous procedure can be followed when a line end is connected to a connection on a panel, in which case the line end and the connection are each provided with machine-readable pieces of information.

For example, the processing unit can verify at predetermined intervals whether further automatically executable steps, whose enabling depends on the execution status of predefined steps to be executed manually having been set to "executed", have been enabled, and the control device can then initiate these enabled automatically executable steps. These automatically executable steps can optionally be enabled with a predetermined delay with respect to setting the execution status of the predetermined steps to "executed."

This means, the control device controls the automatically executable steps taking into account the execution status.

For example, opening certain valves to tanks of cleaning fluid and starting pumps that pump cleaning fluid through the lines can be enabled only when the execution status of all steps separating the lines from the food tanks and establishing the correct connections to the tanks of cleaning fluid and possibly to waste water tanks or drains has been set to "executed".

In all cases mentioned above, the mobile terminal can optionally output an indication once the execution status for one step is or has been set to "executed". It can also display a list of steps to be executed and their respective current execution status, where the steps are preferably displayed in the sequence in which they must be executed, if such a sequence has been predetermined. The user can also be shown instructions on how to execute the step. The user can then follow the instructions.

It is understood that the features mentioned in the embodiments described above are not restricted to these specific combinations and are also possible in any other combination.

The invention claimed is:

1. A method for operating an assembly for processing liquid food products, comprising:
   reading, via a mobile terminal, machine-readable pieces of information attached to various elements forming the assembly for processing liquid food products, the machine-readable pieces of information identifying at least one of the various elements,
   confirming that predetermined manual steps for assembling or adjusting the various elements have been executed by reading out the machine-readable pieces of information on at least one predetermined element of the various elements by way of the mobile terminal,
   updating a display on the mobile terminal to indicate an execution status of the at least one predetermined element of the various elements,
   transmitting the execution status of the at least one predetermined element of the various elements to a control device, and
   automatically executing, via the control device, the automatically executable steps, where the automatic execution takes into account an execution status of the steps to be manually executed, where if the execution status of the steps to be manually executed is set to "not executed" or "executed incorrectly", the control device prevents the automatically executable steps from starting.

2. The method according to claim 1, where a processing unit determines whether two pieces of machine-readable information read out in immediate succession using the mobile terminal identify a connection of two predetermined elements of the various elements, and where the two pieces of machine-readable information have been read out within a predetermined time window.

3. The method according to claim 2, where the execution status for the step of connecting the two predetermined elements is set to "executed", on the condition that the machine-readable pieces of information read out in immediate succession identify the two predetermined elements of the various elements, and the information was read out in the predetermined time window, and where the execution status is otherwise set to "not executed" or "executed incorrectly".

4. The method according to claim 3, where the mobile terminal outputs a warning if the condition is not satisfied.

5. The method according to claim 1, where the machine-readable pieces of information comprise optically readable pieces of information and/or electronically readable pieces of information.

6. The method according to claim 5, where an RFID tag or an NFC antenna containing the machine-readable pieces of information is applied to at least one of the various elements, and where the machine-readable pieces of information are read out by way of a respective antenna of the mobile terminal.

7. The method according to claim 5, where a QR Code© or a barcode is applied to at least one of the various elements and the machine-readable pieces of information are read out by way of a camera of the mobile terminal.

8. The method according to claim 1, where a representation of at least some of the steps to be executed manually and a current execution status of the steps to be executed manually are shown on a display section of the mobile terminal.

9. The method according to claim 1, where determining, changing, and/or storing the execution status of the steps to be executed manually is done by use of the mobile terminal and a current execution status of one or more of the steps to be executed manually is then transmitted from the mobile terminal to the control device via a data connection.

10. The method according to claim 1, where the mobile terminal reads out the machine-readable pieces of information and transmits them by way of a data connection to the control device and the control device determines, changes, and/or stores said execution status.

11. The method according to claim 1, where the various elements of the assembly comprise a locking element to which identifying machine-readable information is applied, where the steps to be executed manually comprise locking two predetermined elements of the various elements, by way of the locking element, and where a relative position of the machine-readable information identifying the locking element indicates whether the two predetermined elements of the various elements are locked.

12. The method according to claim 1, where the various elements comprise a locking element, where the steps to be executed manually comprise locking two predetermined elements of the various elements, by way of the locking element, where a photo of the locking element is created by way of a camera or a camera of the mobile terminal, where a user terminal or the processing unit, by way of an image processing method, compares the created photo to a stored photo showing a target state after the two predetermined elements to be locked have been locked, and where, determined by the comparison of the two photos whether the step of locking has been executed correctly, the execution status is set to "executed" if the step of locking has been executed correctly.

13. A system with an assembly for processing liquid food products, where machine-readable pieces of information are applied to various elements of the assembly, the machine-readable pieces of information identifying each respective element of the various elements of the assembly, the system comprising:
   a control device for controlling automatically executable process steps, and
   a mobile terminal,
   where the control device is adapted to control the automatically executable steps taking into account an execution status of one or more of the steps to be executed manually, where the execution status reflects whether the machine-readable pieces of information on at least one predetermined element have been read out by way of the mobile terminal.

14. The system according to claim 13, where the control device is adapted to receive read out machine-readable pieces of information from the mobile terminal and determines from the received machine-readable pieces of information whether the execution status of one or more of the steps to be executed manually must be changed and, changes the execution status accordingly.

15. The system according to claim 13, where the control device is adapted to receive information identifying a step to be executed manually and an execution status of the step to be manually executed, and where the mobile terminal or an external processing unit is adapted to determine, change, and store the execution status of the step to be manually executed.

* * * * *